(12) United States Patent
Darner et al.

(10) Patent No.: US 8,714,318 B2
(45) Date of Patent: May 6, 2014

(54) PARKING BRAKE CHAMBER INTERNAL BREATHING SYSTEM

(75) Inventors: Brett S. Darner, Wellington, OH (US); Ronald S. Plantan, Mooresville, NC (US); Mark J. Kromer, Huron, OH (US); Randy J. Salvatora, North Olmsted, OH (US)

(73) Assignee: Bendix Spicer Foundation Brake, LLC, Elyria, OH (US)

( * ) Notice: Subject to any disclaimer, the term of this patent is extended or adjusted under 35 U.S.C. 154(b) by 0 days.

(21) Appl. No.: 13/247,686

(22) Filed: Sep. 28, 2011

(65) Prior Publication Data

US 2013/0075212 A1  Mar. 28, 2013

(51) Int. Cl.
F16D 65/22 (2006.01)

(52) U.S. Cl.
USPC .................................. 188/170; 188/153 D (58) Field of Classification Search
USPC .................. 188/153 D, 170; 92/82, 130 R
See application file for complete search history.

(56) References Cited

U.S. PATENT DOCUMENTS

| | | | |
|---|---|---|---|
| 3,401,606 A | 9/1968 | Mathews et al. | |
| 3,712,181 A | 1/1973 | Swander, Jr. et al. | |
| 3,800,668 A * | 4/1974 | Valentine | 91/399 |
| 5,722,311 A | 3/1998 | Pierce et al. | |
| 5,836,233 A | 11/1998 | Rumsey | |
| 5,937,733 A | 8/1999 | Stojic | |
| 6,148,711 A | 11/2000 | Stojic | |
| 6,874,405 B2 | 4/2005 | Fisher | |
| 6,907,818 B2 * | 6/2005 | Anderson | 92/62 |
| 7,121,191 B1 | 10/2006 | Fisher | |
| 7,513,341 B2 | 4/2009 | Lachermeier | |
| 2007/0034465 A1 | 2/2007 | Thompson et al. | |
| 2008/0000733 A1 * | 1/2008 | Ehrlich | 188/79.55 |

FOREIGN PATENT DOCUMENTS

EP  0 279 930 A1  8/1988
GB  1 237 641 A   6/1971

OTHER PUBLICATIONS

International Search Report (PCT/ISA/210) dated Nov. 2, 2012 (three (3) pages).
Written Opinion (PCT/ISA/237) dated Nov. 2, 2012 (seven (7) pages).

* cited by examiner

*Primary Examiner* — Bradley King
(74) *Attorney, Agent, or Firm* — Crowell & Moring LLP (57) ABSTRACT

A spring-type brake actuator for a pneumatically-operated vehicle brake is provided, in which the portion of the brake actuator containing the parking brake actuation power spring is arranged to be vented to atmosphere but not to permit entry of outside environmental air into the power spring chamber, the spring-type brake actuator being provided with an internal breather valve which permits clean dry air from the parking brake release chamber to enter the power spring chamber which the pressure difference between the chambers falls to within a predetermined pressure range.

16 Claims, 5 Drawing Sheets

PARKING BRAKE CHAMBER INTERNAL BREATHING SYSTEM

BACKGROUND AND SUMMARY OF THE INVENTION

The present invention relates to a spring-type brake actuator for the braking system for a vehicle, and in particular to an internal venting/breathing system to minimize entry of potentially contaminated exterior environment air into such an actuator.

It is well known to employ so-called "spring brake" actuators to provide service, parking and emergency brake operation on vehicles such as commercial trucks, tractors and trailers equipped with lever-operated drum or disc brakes. Spring-type brake actuators are typically pneumatically operated, and are supplied with operating air from a compressed air source on the vehicle. These actuators also typically are arranged in a "fail-safe" manner, i.e., where the actuator defaults to a brake application state upon loss of operating air pressure.

Figure 1:
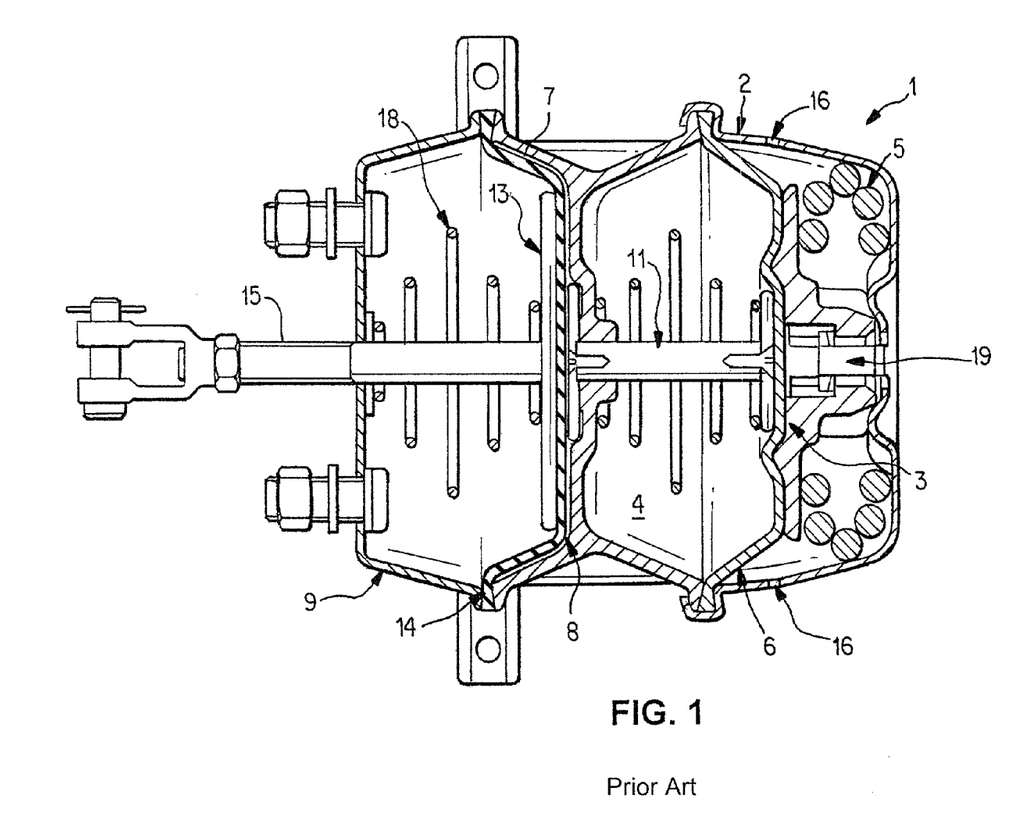
FIG. 1 is a cross-section view of an example of a previously known spring-type pneumatic brake actuator.

An example prior art spring brake actuator is shown in cross-section view in FIG. 1. Actuator housing 1 includes a rear cylinder 2 in which a rear piston 3 is displaceably arranged. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably.

The rear ventilation chamber is isolated from the spring side of piston 3 by an annular seal 6. An intermediate flange 8 (also known as a "wall") separates rear cylinder 2 from a front cylinder 9. The intermediate flange 8 traversed by a seal 10 through which passes a parking brake application rod 11, formed as an extension of rear piston 3. The parking brake application rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the parking brake application rod 11, such that the front piston 13 can be displaced in a brake application direction by the rear piston 3 and/or by the application of pneumatic pressure in front ventilation chamber 7. An actuating rod 15 for actuating a brake lever of a vehicle brake is provided on the front side of the front piston 13.

FIG. 1 also shows mounting studs 16 provided for mounting of the actuator 1 on the vehicle brake, as well as a light return spring 18 which biases front piston 13 toward the rear of front chamber 7.

When no pneumatic pressure is present in the FIG. 1 actuator unit, the brake actuation spring 5 applies a high spring force to rear piston 3, which in turn applies this force via parking brake application rod 11 to front piston 13 to cause the actuator rod 15 to apply the vehicle brake. In this state, the vehicle brake functions as a parking brake, preventing vehicle movement.

When release of the parking brake is desired, the rear ventilation chamber 4 is filled with compressed air via a ventilation port (not illustrated). As the force generated by the increasing air pressure on the front side of rear piston 3 exceeds the force generated by brake application spring 5, the rear piston 3 and parking brake application rod 11 move toward the rear of the rear cylinder 2, compressing spring 5 and causing air in the rear of rear cylinder 2 to be vented to atmosphere through passages in rear piston 3 (not illustrated) to vent path 19 or side holes 16.

As parking brake application rod 11 moves towards the rear, the force previously applied to front piston 13 is relieved, and the return spring 18 biases the front piston 13 toward the rear of front cylinder 9, thereby withdrawing actuating rod 15 away from and releasing the vehicle brake. The vehicle therefore moves from a state in which it is braked by the brake actuator spring 5, to a non-braked state in which the vehicle may be moved. The vehicle brake is applied as a service during normal operation by admitting compressed air into the front ventilation chamber 7 (via a port not shown in FIG. 1). Because air pressure in rear ventilation chamber 4 continues to hold parking brake application rod 11 at the rear of the rear cylinder 2, the front piston 13 and actuating rod 15 are free to move forward and backward within the front cylinder as necessary to respond to the operator's brake actuation demands.

Existing designs which have the rear chamber containing the brake actuator spring vented to the atmosphere are vulnerable to internal corrosion due to exposure to the environment, where water and/or solid debris ("grit" or de-icing solids) may enter the chamber, causing the power spring and other components, including the housing itself, to corrode and potential suffer early functional failure over time. The venting to atmosphere is typically provided with at least one chamber breather on the spring side of the rear cylinder. These breathers relieve any pressure leaking into the rear of the actuator housing from the rear chamber, as well as providing a path for air to pass as the air in the power spring side of the rear chamber is compressed when the parking brake piston compresses the power spring. The corrosion concern arises from splashing of contaminated water or road debris onto the actuator housing where in can enter the power spring chamber, and from the inflow of external air when the rear chamber is depressurized and the brake actuator spring expands back to its parking position. The air entering the spring side of the cylinder through the breather contains water in the form of humidity, and the material splashed onto the actuator, e.g., rain water, road salt and de-icing solutions, are also sources of corrosive chemicals.

In view of the foregoing problems with current spring-type brake actuator parking brake pistons and related actuator components, the present invention provides an improved parking brake chamber ventilation/breather system which allows the use of internally-vented chambers and thus eliminate the need to allow intake of external air into the power spring chamber and the associated corrosion problems.

In the present invention the parking brake release actuator is provided with an internal breather valve. The spring housing may be provided with a one-way vent from the spring housing to the atmosphere. The internal breather valve is preferably located in the parking brake release actuator piston adjacent to a passage from the parking brake release pressure chamber. The internal breather valve is closed when the parking brake release chamber is pressurized to a high enough level to compress the power spring and withdraw the parking brake operating rod and is open when the parking brake release chamber is fully depressurized. The internal breather valve is also arranged to be momentarily open when the pressure in the chamber containing the power spring is only slightly higher than the pressure in the parking brake release chamber so that only clean, dry air from the parking brake release pressure chamber enters the power spring chamber. Advantageously, the internal breather valve may be located in a threaded insert which is in turn affixed (for example by press-fitting or welding) to a parking brake actuator piston made up from a stamped piston. The internal breather valve may also be provided in other parking brake actuator piston designs, such as a cast aluminum piston.

Further, to prevent excessive pressure in the power spring chamber, the spring actuator is provided with an elastomeric plug device which seals off the spring housing opening for insertion of a manual parking brake piston withdrawal rod, where the plug device has a one-way valve which permits pressure to escape from the power spring chamber (for example, as pressure in the chamber increases when the parking brake release piston is moved to the fully-released brake position) while sealing against flow of air from the outside environment into the spring housing. One of ordinary skill will recognize that the plug need not be formed from an elastomeric material, and may be formed for a plurality of subparts.

With the present breathing/ventilation system, only clean, dry air from the vehicle's air preparation system reaches the power spring chamber, as there is no path for environmental contaminates to enter the spring housing. Accordingly, the working life of the spring-type brake actuator is significantly extended. Further, where previous attempts at providing internal breathing brake chambers have required expensive-to-manufacture designs that have not been easily adapted to high volume, low cost, simplified spring brake production, the present system provides a low cost approach to providing clean, dry make-up air in a manner which minimizes the potential for contamination from external air sources. In addition, by providing for venting of pressure from the power spring chamber at a pressure which need only be nominally above the external pressure, the present invention permits the parking brake to be released at low operating pressures when the vehicle is on a grade (as when a driver must use the service brake when releasing the parking brake to prevent roll back of the vehicle), as the parking brake release actuator does not have to also overcome high pressure in the power spring chamber.

Other objects, advantages and novel features of the present invention will become apparent from the following detailed description of the invention when considered in conjunction with the accompanying drawings.

DETAILED DESCRIPTION OF THE DRAWINGS

Figure 2:
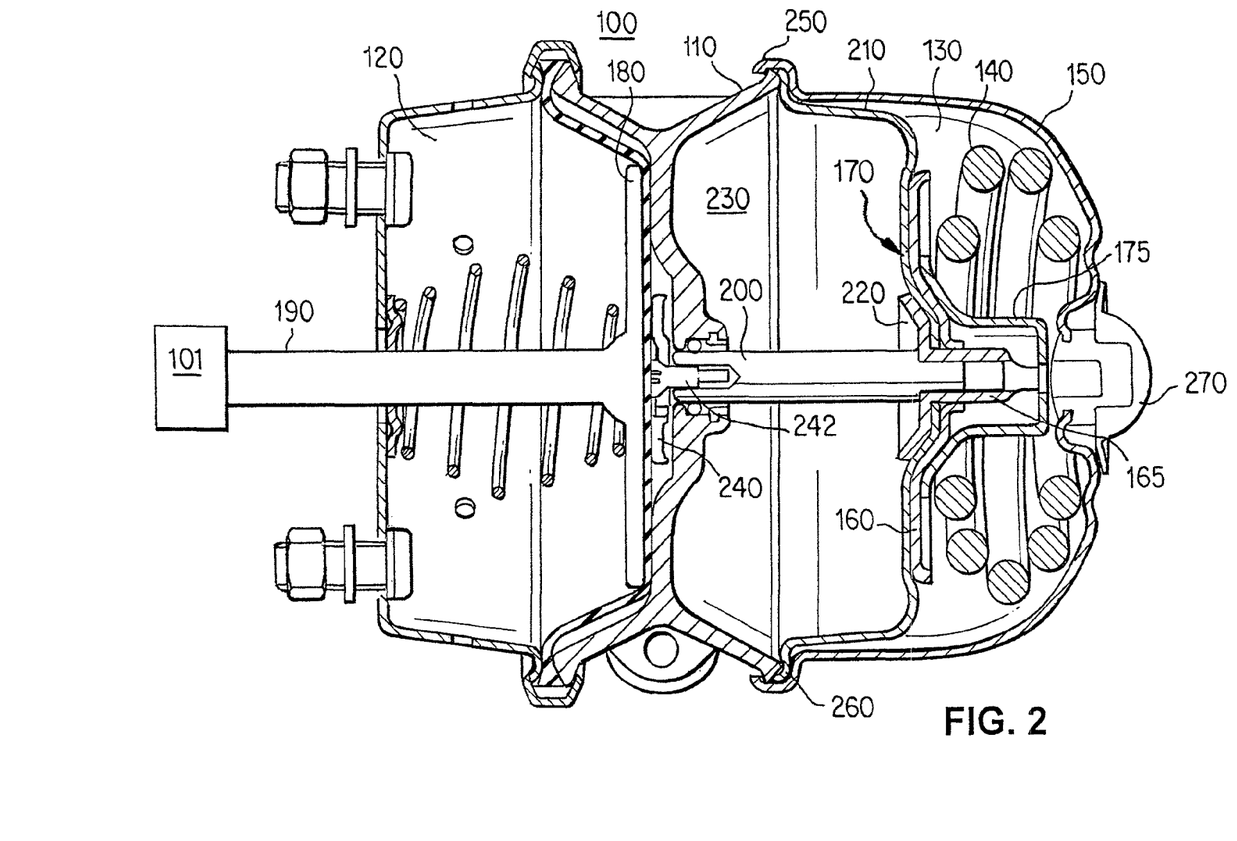
FIG. 2 is a cross-section view of an embodiment of a spring-type brake actuator in accordance with the present invention.

FIG. 2 is a cross-section view of a spring-type brake actuator 100 in accordance with a first embodiment of the present invention.

The actuator housing comprises an intermediate flange 110, front cylinder 120 at a vehicle brake end of spring brake actuator 100, and rear cylinder 130 on the opposite side of intermediate flange 110. The terms "front" and "rear" as used herein describe the directions facing toward and facing away, respectively, a vehicle brake to which the actuator 100 is to be mounted. Thus, in FIG. 2, "front" is the direction toward the left side of the figure, and "rear" is the direction toward the right side of the figure.

The operating elements of spring brake actuator 100 include a brake actuator spring 140, which has one end resting on an inside rear face of spring housing 150, and an opposite end resting on a rear-facing side of a parking brake release piston 170. It is to be understood that the present invention is not limited to a coil spring, but includes any elastic member which provides the energy storage and return function required by a parking brake actuator. For example, alternative spring configurations, including multiple coil springs, leaf springs, cantilevered springs, etc., and alternative elements such as resilient blocks or chargeable high pressure bladders, are within the scope of the present invention.

Also included in spring brake actuator 100 are service brake actuator 180, brake actuator rod 190 and parking brake application rod 200. The spring brake actuator 100 is mounted on schematically-illustrated vehicle axle and brake unit 101, with brake actuator rod 190 connected to an operating member of the brake (which may be, for example, a drum brake or disk brake).

The parking brake release piston 170 in this embodiment comprises a diaphragm 210 captured between a supporting backing plate 220 within rear chamber 230 (the chamber being formed when spring housing 150 is mated to intermediate flange 110) and stamped parking brake plate 160. In this embodiment, the backing plate 220 and stamped piston 170 are joined by a breather valve section 165 (details shown in FIG. 3) under a spring seat cap 175. In this example, the spring seat cap has a height which assists in controlling the depth of retraction of the parking brake release piston 170 when the piston is manually retracted.

As the brake end of parking brake application rod 200 is affixed a travel limiting member, in this embodiment a disk-shaped plate 240 secured by fastener 242. The travel limiting member may have any configuration (round, square, oval, etc.), and specifically need not be a plate member, as long as (whatever its shape) it abuts the intermediate flange 110 and transfers pressure loads from the parking brake release piston 170 to the intermediate flange 110 when the parking brake release piston 170 reaches the fully-retracted position, and as long as the travel limiting member can transfer parking brake actuation force from the parking brake application rod 200 to the service brake actuator 180 to cause brake actuator rod 190 to actuate the brake.

In this embodiment, the spring housing 150 of rear cylinder 130 is a lightweight aluminum cap whose bead flange 250 cooperates with a corresponding bead of intermediate flange 110 to capture an outer rim 260 of rear diaphragm 210 therebetween. In order to minimize manufacturing and material costs, the bead flange 250 here has simply been rolled over and crimped to secure the spring housing 150 to intermediate flange 110. Alternatively, a field-serviceable joint, such as a clamping ring, may be provided if the capability to remove the spring housing 150 in the field is desired, for example to enable replacement of a diaphragm or an internal seal.

Parking brake release piston 170 is shown in FIG. 2 in the fully withdrawn position at the rear of parking brake actuator chamber 230. This position is achieved when sufficient pneumatic pressure to overcome the spring force developed by brake actuating spring 140 has been supplied, via a supply port (not illustrated), to the portion of chamber 230 between the diaphragm 210 and the rear side of intermediate flange 110. The portion of the chamber on the opposite side of diaphragm 210, previously vented to the atmosphere, is sealed in this embodiment by a plug 270 to prevent intrusion of environmental contaminants during normal operation of the brake actuator. The plug 270 is removable to permit insertion of a manual parking brake actuator retraction tool (not illustrated) for manual withdrawal of the parking brake piston to the parking brake release position for service. The plug 270 may also contain a one-way valve to permit venting of pressure from the power spring chamber while preventing entry of outside air, and thereby eliminating any need to provide vent holes in the spring housing 150. The elimination of such holes simplifies manufacture and lowers costs, while also eliminating stress concentration points on the spring housing.

Figure 3:
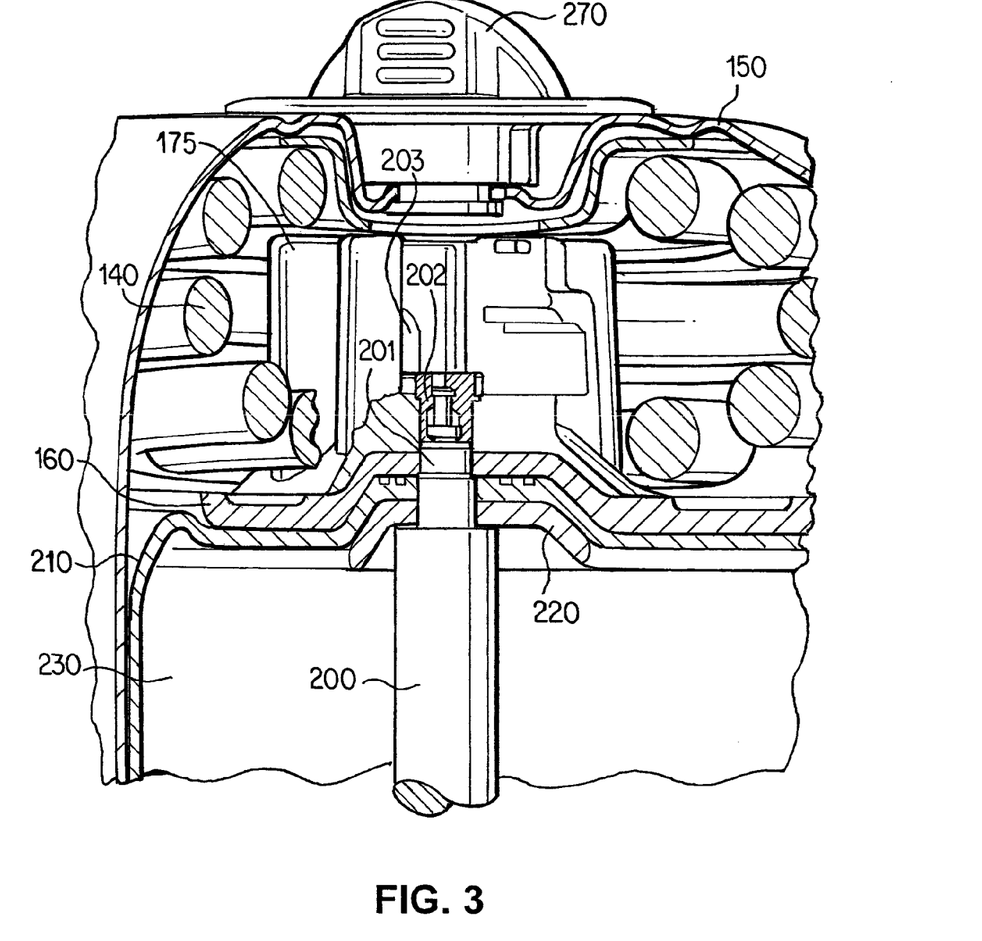
FIG. 3 is cross-section view of a portion of a spring-type brake actuator similar to that shown in FIG. 2, centered on the region including a cast parking brake piston of this embodiment.

FIG. 3 is a cross-section view of the parking brake release portion of an actuator similar to that shown in FIG. 2, showing the arrangement of the parking brake release actuator and internal breather valve components. In this embodiment, the diaphragm 210 is captured between a parking brake plate 160 and backing plate 220. Also illustrated in cross-section is the parking brake application rod 200. The rod is provided with a slot 201 which permits internal passage of air between the opposite sides of the chamber to allow venting of pressure in the rear of the parking brake chamber between the opposite sides, rather than venting to the outside environment. The internal breather valve includes a breather valve 202 and associated air passage 203. The breather valve 202 controls movement of air between the parking brake actuation chamber 230 into the chamber with the power spring 140. The outlet of the air passage 203 through the spring seat cap 175 is shown in the partial cut-away view in FIG. 4.

Figure 4:
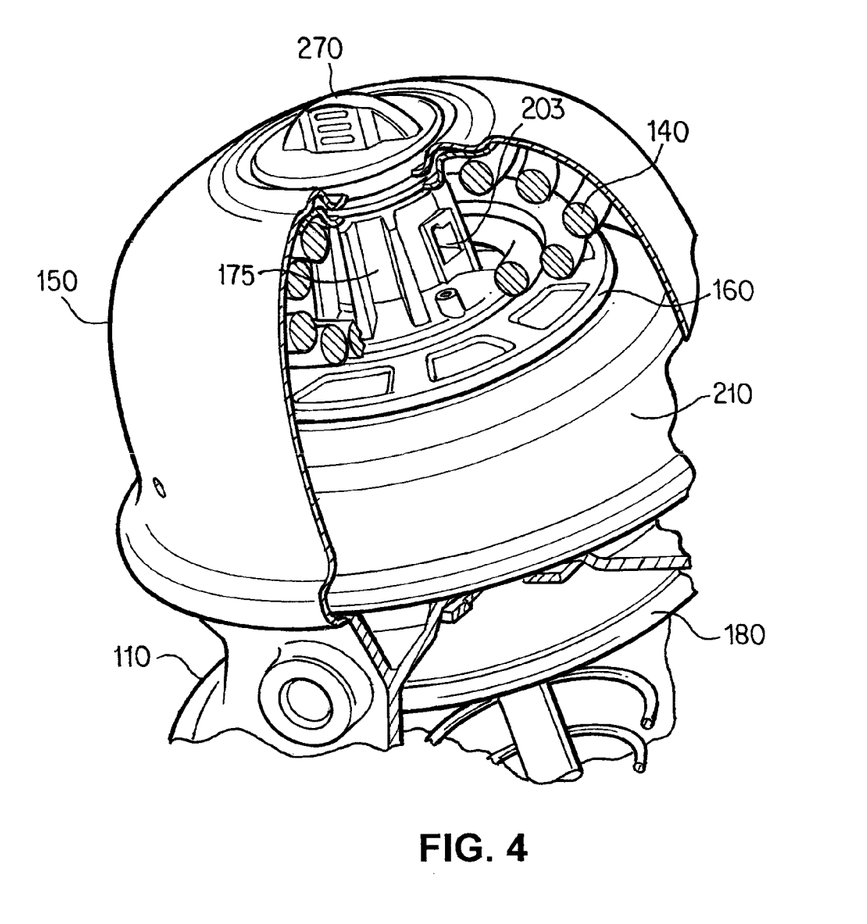
FIG. 4 is a partial cut-away view of a spring-type brake actuator similar to that shown in FIG. 2, centered on the region including the power spring chamber and cast parking brake piston of this embodiment.

The internal breather valve is covered by the spring seat cap 175 which, as shown in FIG. 4, receives one end of the power spring 140 and protects a cast parking brake release piston 170 from localized high stresses from the end of the power spring coil.

Figure 5:
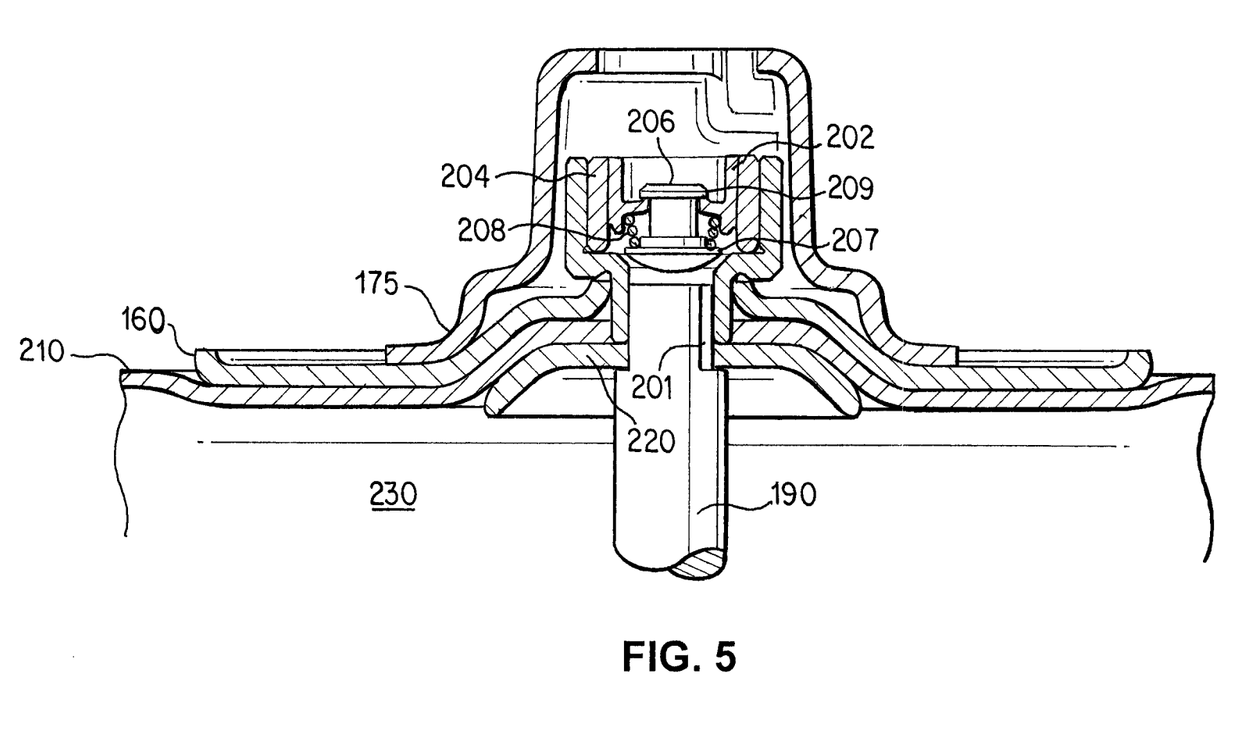
FIG. 5 is a further partial cut-away view of a spring-type brake actuator similar to that shown in FIG. 2, centered on the region including the breather valve located on a stamped parking brake piston of this embodiment.

Additional detail of the breather valve in this embodiment is shown in FIG. 5. In this embodiment, the breather valve member 202 includes a breather valve body 204 located between the brake actuator rod 190 and the air passage 203, a movable valve closure member 206, and a valve biasing spring 208. The internal breather valve components are configured such that when the pressure in the parking brake release chamber 230 is above the pressure in the power spring chamber by a predetermined amount, the release chamber end 207 of the valve closure member 206 rests against a first seat of the breather valve body 204, thereby preventing flow of pressure from the release chamber 230 into the power spring chamber. Conversely, when the pressure in the power spring chamber is above the pressure in the parking brake release chamber 230, the power spring chamber end 209 of the valve closure member 206 rests against a second seat of the breather valve body 204, thereby preventing flow of pressure from the power spring chamber into the parking brake release chamber 230.

The internal breather valve 202 is also provided with a small biasing spring 208 between the valve closure member 206's parking brake release chamber end 207 and the first seat of the breather valve body 204. This spring provides a biasing force on the valve closure member that permits clean dry air in the parking brake release chamber to pass into the power spring chamber during the brief period when the pressure in the parking brake release chamber has fallen below a pressure required to overcome the spring and hold the valve member 206's end 207 against the first valve seat, but is still above the pressure in the power spring chamber, such that the power spring chamber end 209 of the valve member 206 has not yet come to rest on the second seat of the valve body 204.

During operation of the spring brake actuator 100, air is admitted to parking brake release chamber 230 to cause the parking brake release piston 170 to move toward the rear of the parking brake housing 150, thereby compressing the power spring 140 and permitting the brake actuator rod 190 to be withdrawn to release the brake. As the parking brake release piston 170 moves toward the rear of the spring housing 150, the air within the power spring chamber is compressed. Because the pressure increase in the parking brake release chamber 230 typically rises in a very rapid manner, there is little opportunity for air in the release chamber 230 to pass through slot 201 and the breather valve before the biasing force of spring 208 is overcome and the parking brake release chamber end 207 of valve member 206 seals against further air movement from the release chamber 230 into the power spring chamber.

If, as the parking brake release piston 170 moves toward the rear of the parking brake housing 150, the air pressure in the power spring chamber rises above the outside atmospheric pressure by more than a nominal amount, the excess pressure is vented out of the power spring chamber via the plug 270; otherwise the pressure in the power spring chamber remains in the chamber. The disk-shaped plate 240 on the end of the parking brake application rod 200 ultimately limits the travel of the parking brake release piston 170, thereby limiting the amount the air in the power spring chamber may be compressed, as well as performing its function of distributing the force generated by excess pressure in the parking brake release chamber 230 through the intermediate flange 110, rather than through housing 150.

As pressure is removed from the parking brake release chamber 230, the pressure passes through a range at which biasing spring 208 pushes the release chamber end 207 of valve member 206 off its seat, allowing clean dry air from the release chamber to pass through slot 201 and internal breather valve 202 into the power spring chamber. This flow of clean, dry helps offset the decrease in pressure in power spring chamber as the parking brake release actuator is moved by the power spring 140 to advance the brake actuator rod 190 in the brake application direction. The flow of air through the internal breather valve 202 continues until the pressure in the release chamber 230 drops below a point at which the pressure in the power spring chamber, combined with the force generated by biasing spring 208, causes the power spring chamber end 209 of the valve member 206 to reach its seat and close off the flow path through breather valve 202. The range of pressure difference between the chambers during which the breather valve permits air to pass may be a predetermined range which is set by adjusting the biasing force generated by spring 208. Under normal operating conditions, because the pressure in the parking brake release chamber is typically above that in the power spring chamber (the power spring chamber pressure typically being limited to no more than a nominal amount above atmospheric pressure by the one-way venting through plug 270), there is not a condition in which there is a need for air in the power spring chamber to flow into the parking brake release chamber 230.

This approach to chamber breathing provides the necessary introduction of air into the power spring chamber to assist in application of the parking brake by power spring 140 (i.e., to minimize the potential for developing a vacuum in the power spring chamber working against full parking brake application) without any need to introduce potentially contaminated outside environmental air into the power spring chamber.

The foregoing disclosure has been set forth merely to illustrate the invention and is not intended to be limiting. For example, a spring brake actuator may have the internal breather valve located in a region other than the center of the parking brake release piston, or located away from the parking brake release actuator entirely (such as a valve located on the housing to control communication through a bypass passage in the housing between the parking brake release chamber and the power spring chamber), would be within the scope of the present invention as long as the above-described clean dry air venting capability is provided. Similarly, an alternative breather structure which permits air to move between the parking brake release chamber and the power spring chamber when the pressure difference between the pressure in the parking brake release chamber and the pressure in the power spring chamber is between a predetermined range, such as a combination of pressure relief valves or deformable diaphragm member which reseals itself after relieving a pressure difference, would also be within the scope of the present invention. Because other such modifications of the disclosed embodiments incorporating the spirit and substance of the invention may occur to persons skilled in the art, the invention should be construed to include everything within the scope of the appended claims and equivalents thereof.

What is claimed is:

1. A spring brake actuator, comprising:
    a spring housing connected with an intermediate flange to form a parking brake actuator chamber;
    a service brake housing connected with the intermediate flange on a side opposite the spring housing;
    a parking brake release actuator located within the parking brake actuator chamber, the parking brake release actuator including a parking brake release piston and a diaphragm which divide the parking brake actuator chamber into a parking brake release chamber on an intermediate flange side of the parking brake release actuator and a power spring chamber on an opposite side of the parking brake release actuator;
    a parking brake actuating power spring located in the power spring chamber biasing the parking brake release piston away from the rear of the spring housing; and
    an internal breather valve arranged to control air flow between the parking brake release chamber and the power spring chamber, wherein the internal breather valve is co-axial with a parking brake application rod connected to the parking brake release piston and is in fluid communication with a passage of the parking brake application rod extending between the parking brake release chamber and the power spring chamber.

2. The spring brake actuator of claim 1, wherein the internal breather valve includes a movable valve member and a biasing spring configured to permit passage of air in the parking brake release chamber into the power spring chamber when a pressure difference between the parking brake release chamber pressure and the power spring chamber is within a predetermined pressure range.

3. The spring brake actuator of claim 2, wherein the spring housing includes a one-way vent configured to permit air to flow out of the spring housing and to not permit air to flow into the spring housing.

4. The spring brake actuator of claim 3, wherein the one-way vent is a removable plug.

5. The spring brake actuator of claim 3, further comprising:
    wherein the parking brake application rod is affixed at a first rod end to the parking brake release piston and at a second rod end to a travel limiting member in the service brake housing, the parking brake application rod having a rod length such that the travel limiting member abuts the second side of the intermediate flange when the parking brake release piston is located at a fully withdrawn position.

6. The spring brake actuator of claim 5, wherein the internal breather valve is covered by a spring seat cap, and the spring seat cap is arranged between the parking brake release piston and the power spring.

7. A vehicle brake assembly, comprising:
    a brake, wherein the brake includes one of a disc brake and a drum brake; and
    a spring brake actuator coupled to the brake to apply a brake actuation force, the spring brake actuator including
        a spring housing connected with an intermediate flange to form a parking brake actuator chamber;
        a service brake housing connected with the intermediate flange on a side opposite the spring housing;
        a parking brake release actuator located within the parking brake actuator chamber, the parking brake release actuator including a parking brake release piston and a diaphragm which divide the parking brake actuator chamber into a parking brake release chamber on an intermediate flange side of the parking brake release actuator and a power spring chamber on an opposite side of the parking brake release actuator;
        a parking brake actuating power spring located in the power spring chamber biasing the parking brake release actuator away from the rear of the spring housing; and
        an internal breather valve arranged to control air flow between the parking brake release chamber and the power spring chamber, wherein the internal breather valve is co-axial with a parking brake application rod connected to the parking brake release piston and is in fluid communication with a passage of the parking brake application rod extending between the parking brake release chamber and the power spring chamber.

8. The vehicle brake assembly of claim 7, wherein the spring housing includes a one-way vent configured to permit air to flow out of the spring housing and to not permit air to flow into the spring housing.

9. The vehicle brake assembly claim 8, wherein the one-way vent is a removable plug.

10. The vehicle brake assembly of claim 8, wherein the internal breather includes a movable valve member and a biasing spring configured to permit passage of air in the parking brake release chamber to the power spring chamber when a pressure in the parking brake release chamber decreases below a predetermined pressure.

11. A vehicle axle assembly, comprising:
    a vehicle axle;
    a brake coupled to the vehicle axle, wherein the brake includes one of a disc brake and a drum brake; and
    a spring brake actuator coupled to the brake to apply a brake actuation force, the spring brake actuator including
        a spring housing connected with an intermediate flange to form a parking brake actuator chamber;
        a service brake housing connected with the intermediate flange on a side opposite the spring housing;

a parking brake release actuator located within the parking brake actuator chamber, the parking brake release actuator including a parking brake release piston and a diaphragm which divide the parking brake actuator chamber into a parking brake release chamber on an intermediate flange side of the parking brake release actuator and a power spring chamber on an opposite side of the parking brake release actuator;

a parking brake actuating power spring located in the power spring chamber biasing the parking brake release piston away from the rear of the spring housing; and an internal breather valve arranged to control air flow between the parking brake release chamber and the power spring chamber, wherein the internal breather valve is co-axial with a parking brake application rod connected to the parking brake release piston and is in fluid communication with a passage of the parking brake application rod extending between the parking brake release chamber and the power spring chamber.

12. The vehicle axle assembly of claim 11, wherein the spring housing includes a one-way vent configured to permit air to flow out of the spring housing and to not permit air to flow into the spring housing.

13. The vehicle axle assembly of claim 11, wherein the internal breather valve is arranged at a center of the parking brake release actuator and includes a movable valve member and a biasing spring configured to permit passage of air in the parking brake release chamber to the power spring chamber when a pressure in the parking brake release chamber decreases below a predetermined pressure.

14. A spring brake actuator, comprising:
a spring housing connected with an intermediate flange to form a parking brake actuator chamber;
a service brake housing connected with the intermediate flange on a side opposite the spring housing;
a parking brake release means located within the parking brake actuator chamber for releasing a parking brake function of the spring brake actuator;
a parking brake actuating means located in the power spring chamber for biasing the parking brake release means in a parking brake application direction; and
an internal breather means arranged to control air flow between the parking brake release chamber and the power spring chamber, wherein the internal breather means is co-axial with a parking brake application rod connected to the parking brake release piston and is in fluid communication with a passage of the parking brake application rod extending between the parking brake release chamber and the power spring chamber.

15. The spring brake actuator of claim 14, wherein the spring housing includes a one-way vent means configured to permit air to flow out of the spring housing and to not permit air to flow into the spring housing.

16. The spring brake actuator of claim 15, wherein the internal breather means is configured to permit passage of air in the parking brake release chamber to the power spring chamber when a pressure difference between the parking brake release chamber pressure and the power spring chamber is within a predetermined pressure range.

* * * * *